United States Patent Office 3,445,514
Patented May 20, 1969

3,445,514
1,2,4,7,7 - PENTACHLOROTRICYCLO[2,2,1,0,$^{2,6}$]HEPTANE-3-ONE-5-SULFONYL CHLORIDE
Everett E. Gilbert and Benjamin Veldhuis, Morris Township, Morris County, N.J., assignors to Allied Chemical Corporation, New York, N.Y., a corporation of New York
No Drawing. Filed Oct. 15, 1965, Ser. No. 496,696
Int. Cl. C07c 143/70
U.S. Cl. 260—543                                 1 Claim

ABSTRACT OF THE DISCLOSURE

Production of 1,2,4,7,7-pentachlorotricyclo[2,2,1,0$^{2,6}$] heptane-3-one-5-sulfonyl chloride, a new cyclic sulfonyl chloride having nematocidal activity.

This invention relates to a new cyclic sulfonyl chloride, useful as a nematocide, and to processes for producing the same.
The novel cyclic sulfonyl chloride of this invention has the following structural formula:

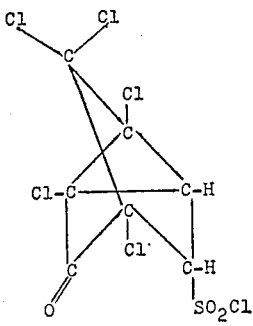

The compound can be designated as 1,2,4,7,7-pentachlorotricyclo[2,2,1,0$^{2,6}$]heptane-3-one-5-sulfonyl chloride.
Accordingly, it is an object of this invention to provide a novel cyclic sulfonyl chloride. Another object of the invention is to provide processes for the production of the novel cyclic sulfonyl chloride. Still another object of the invention is to provide novel nematocidal compositions containing the cyclic sulfonyl chloride as active ingredient. Finally, it is an object of the invention to provide a method of treating nematode-infested soil with the cyclic sulfonyl chloride. Other objects and advantages of the invention will be apparent from the following description.
In accordance with this invention, the cyclic sulfonyl chloride is prepared by treating 1,2,3,4,7,7-hexachloro-3-hydroxy - 5-sulfotricyclo[2,2,1,0$^{2,6}$]heptane sultone or a 1,2,4,7,7 - pentachlorotricyclo[2,2,1,0$^{2,6}$]heptane-3-one-5-metal sulfonate with phosphorus pentachloride.
1,2,3,4,7,7 - hexachloro - 3 - hydroxy-5-sulfotricyclo-[2,2,1,0$^{2,6}$]heptane sultone is described and claimed in copending application Ser. No. 332,268 of Everett E. Gilbert and Richard F. Sweeney, filed Dec. 20, 1963. It is prepared by reacting hexachlorobicycloheptadiene with sulfur trioxide. 1,2,4,7,7 - pentachlorotricyclo[2,2,1,0$^{2,6}$]heptane-3-one-5-metal sulfonates are obtained in hydrate form by reacting the sultone with metal hydroxides. Preparation of 1,2,4,7,7 - pentachlorotricyclo[2,2,1,0$^{2,6}$]heptane-3-one-5-potassium sulfonate hydrate is described in Serial No. 332,268.
1,2,3,4,7,7 - hexachloro - 3 - hydroxy-5-sulfotricyclo-[2,2,1,0$^{2,6}$]heptane sultone, hereinafter referred to as the "sultone," has the following structural formula:

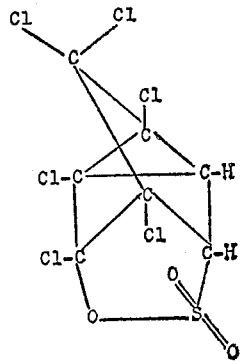

Although any 1,2,4,7,7-pentachlorotricyclo-[2,2,1,0$^{2,6}$]-heptane-3-one-5-metal sulfonate can be used, we prefer to employ an alkali metal or alkaline earth metal sulfonate, and particularly an alkali metal sulfonate such as the sodium or potassium sulfonate. The sulfonate may be employed in hydrate form, as produced. Alternatively, if desired, the sulfonate hydrate may be dehydrated before use, as by heating or azeotroping. 1,2,4,7,7-pentachlorotricyclo - [2,2,1,0$^{2,6}$]heptane-3-one-5-sodium sulfonate hydrate, for example, has the following structural formula:

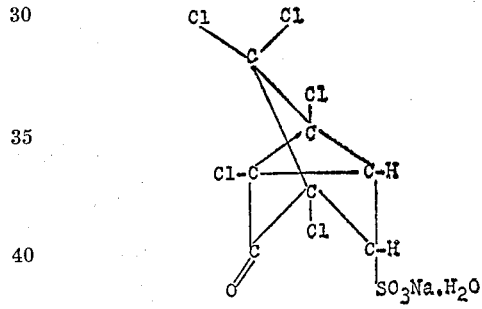

The starting materials of the process of this invention may be employed in mol ratio of about 1 to 5 mols of phosphorus pentachloride per mol of the sultone or metal sulfonate. Although higher mol ratios may be used, they tend to become uneconomical. Particularly outstanding results have been obtained using about 1 to 2 mols of phosphorus pentachloride per mol of the sultone or metal sulfonate.
When the metal sulfonate is employed, reaction with the phosphorus pentachloride takes place in which the metal component is replaced by a chlorine atom. In the case of the sultone per se, the phosphorus pentachloride appears to function catalytically to effect isomerization of the sultone to the desired cyclic sulfonyl chloride product. Surprisingly, however, catalytic amounts of phosphorus pentachloride are not effective in producing substantial amounts of the product.
The temperature employed during the process may vary from about 130° to 190° C., but is preferably maintained at about 160° to 170° C. Of course, if superatmospheric or subatmospheric pressure conditions are employed, the reaction temperatures may be proportionally increased or decreased.
The desired product is readily recovered by drowning the reaction mixture in cold water, extracting the product with a chlorinated hydrocarbon such as carbon tetrachloride or methylene chloride and precipitating the product from solution by distilling off the solvent or adding a suitable non-solvent for the product such as hexane.

When used as a nematocide, the cyclic sulfonyl chloride of this invention may be introduced into the soil "as is" or in a variety of nematocidal compositions. The compositions may be applied to nematode-infested soil in any conventional manner, as by spraying, drenching or by dusting. The term "soil," as used herein, is meant to include any medium capable of supporting the growth of plants. In addition to soil, it is intended to include humus, manure, compost, sand and artificial plant growth media, including hydroponic media.

The cyclic sulfonyl chloride is preferably distributed in the soil by introduction in water such as employed to irrigate the soil. In this procedure, the amount of water may be varied in accordance with the moisture content and the moisture equivalent of the soil in order to obtain the desired depth of distribution of the toxic compound.

The cyclic sulfonyl chloride may also be formulated as dust or granular compositions containing carriers or fillers such as talc, sand, fuller's earth, chalk, gypsum, etc., including active ingredients such as fertilizers, insecticides and fungicides.

The cyclic sulfonyl chloride is effective as a nematocide when distributed in the infested soil as a dosage of at least 50 pounds per acre, and preferably between about 100 and 300 pounds per acre. In order to obtain complete eradication of the undesired nematodes, it is desirable that the soil be impregnated with the cyclic sulfonyl chloride to a depth of at least about 6 inches.

The following examples, in which parts are by weight, illustrate the invention but are not to be construed as limiting it in any manner whatsoever.

EXAMPLE 1

5 parts of 1,2,4,7,7-pentachlorotricyclo[2,2,1,0$^{2,6}$]-heptane-3-one-5-sodium sulfonate hydrate (formed by reaction of 1,2,3,4,7,7-hexachloro-3-hydroxy-5-sulfotricyclo[2,2,1,0$^{2,6}$]-heptane sultone with sodium hydroxide) were mixed with 5 parts of phosphorus pentachloride, and the mixture was heated with stirring for several hours at temperature of 160° C. The resulting mixture was drowned in cold water and extracted with carbon tetrachloride. Upon exaporation of the solvent, one part of 1,2,4,7,7-pentachlorotricyclo[2,2,1,0$^{2,6}$]heptane - 3 - one - 5 - sulfonyl chloride was obtained.

EXAMPLE 2

38 parts of 1,2,3,4,7,7-hexachloro-3-hydroxy-5-sulfotricyclo[2,2,1,0$^{2,6}$]heptane sultone were mixed with 25.5 parts of phosphorus pentachloride for six hours up to a temperature of 160° C. Phosphorus pentachloride was removed from the mixture by distillation. The mixture was then drowned in cold water, and the resulting solid was filtered, washed, and dried to give 33.5 parts of crude 1,2,4,7,7-pentachlorotricyclo[2,2,1,0$^{2,6}$]heptane - 3 - one-5-sulfonyl chloride. The crude product was purified by dissolving it in methylene chloride, washing the solution with water, drying, stirring with decolorizing carbon and filtering. 20 parts of relatively pure product were recovered by recrystallization from hexane.

EXAMPLE 3

76 parts of 1,2,3,4,7,7-hexachloro-3-hydroxy-5-sulfotricyclo[2,2,1,0$^{2,6}$]heptane sultone and 51 parts of phosphorus pentachloride were heated for 10 hours at reflux (167° C.). The mixture was cooled, poured into cold water, filtered, washed and dried. 64.7 parts of crude 1,2,4,7,7-pentachlorotricyclo[2,2,1,0$^{2,6}$]heptane - 3 - one-5-sulfonyl chloride were obtained. A portion (10 parts) of the crude product was purified by dissolving it in methylene chloride, stirring the solution with decolorizing carbon, filtering, distilling off the solvent and recrystallizing the product from a mixture of methylene chloride and hexane.

The 1,2,4,7,7-pentachlorotricyclo[2,2,1,0$^{2,6}$]heptane-3-one-5-sulfonyl chloride product of the above examples had the following properties:

Melting point _____ °C__ 115–120
Percent chlorine:
   Theoretical _____ 56.2
   Found _____ 55.4–55.7

The infrared spectrum of the product showed carbonyl absorption at 5.5 microns. The proton nuclear magnetic resonance spectrum (NMR) of the product indicated the presence of two adjacent non-equivalent hydrogen atoms in the expected range.

The cyclic sulfonyl chloride of this invention may be converted to its corresponding N,N-diethyl sulfonamide, i.e., N,N-diethyl-1,2,4,7,7-pentachlorotricyclo[2,2,1,0$^{2,6}$]-heptane-3-one-5-sulfonamide by treatment by diethylamine. In an illustrative example, 1.5 parts of diethylamine dissolved in about 16 parts of carbon tetrachloride were added over a 20 minute period to 3.8 parts of 1,2,4,7,7-pentachlorotricyclo[2,2,1,0$^{2,6}$]heptane - 3 - one-5-sulfonyl chloride suspended in about 32 parts of the same solvent. A solid precipitated which was filtered and shown to be diethylamine hydrochloride by its infrared spectrum. The filtrate was distilled to remove carbon tetrachloride, and the resultant distillate was dissolved in ethanol, heated with decolorizing carbon, filtered and diluted with water to incipient precipitation. Upon cooling, N,N-diethyl-1,2,4,7,7-pentachlorotricyclo[2,2,1,0$^{26,}$]-heptane-3-one-5-sulfonamide separated. The N,N-diethyl sulfonamide was removed by filtration and dried to give a white solid melting at 129°–130° C.

Elemental analysis of the N,N-diethyl sulfonamide gave the following results:

Calculated (percent): C, 31.8; H, 2.9; Cl, 42.5; S, 7.7; N, 3.4. Found (percent): C, 32.4; H, 3.1; Cl, 42.0; S, 7.8; N, 3.9.

The infrared spectrum of the sulfonamide showed the expected carbonyl group at 5.5 microns.

The nematocidal activity of the cyclic sulfonyl chloride of this invention was determined by a procedure essentially as described by Schuldt and Bluestone in "Contributions of the Boyce Thompson Institute," vol. 19, page 65 (1957). *Panagrellus redivivus* (Linné) nematode culture was added to an aqueous solution containing 1000 parts per million of the cyclic sulfonyl chloride. The aqueous solution was prepared by diluting an acetone solution of the compound (4.8 grams of the compound dissolved in acetone to 100 cc.) with water. Nematode kill was noted after 1, 2 and 3 days. The following results were obtained:

| Days | Percent kill |
|---|---|
| 1 | 85 |
| 2 | 99 |
| 3 | 100 |

Since different embodiments may be made in this invention without departing from the scope and spirit thereof, it is intended to be limited only as indicated in the appended claims.

We claim:
1. 1,2,4,7,7 - Pentachlorotricyclo[2,2,1,0$^{2,6}$]heptane-3-one-5-sulfonyl chloride.

References Cited

UNITED STATES PATENTS 3,201,417   8/1965   Weil.

OTHER REFERENCES

Houben-Weyl, Methoden Der Org. Chemie, vol. 9, page 390 (1955).

Weil, J. Organic Chem., vol. 29, pages 1110–1113 (May, 1964).

LORRAINE A. WEINBERGER, *Primary Examiner.*

H. C. WEGNER, *Assistant Examiner.*

U.S. Cl. X.R.

424—315